United States Patent
Mori

(10) Patent No.: US 11,543,315 B2
(45) Date of Patent: Jan. 3, 2023

(54) FIXED-STATE TESTING METHOD, AND MANUFACTURING METHOD OF BATTERY PACK

(71) Applicant: TOYOTA JIDOSHA KABUSHIKI KAISHA, Toyota (JP)

(72) Inventor: Hideto Mori, Nissin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/741,820

(22) Filed: May 11, 2022

(65) Prior Publication Data

US 2022/0268652 A1 Aug. 25, 2022

Related U.S. Application Data

(62) Division of application No. 16/596,121, filed on Oct. 8, 2019, now Pat. No. 11,385,112.

(30) Foreign Application Priority Data

Nov. 27, 2018 (JP) .............................. JP2018-221610

(51) Int. Cl.
*G01L 5/00* (2006.01)
*H01M 10/0525* (2010.01)
*H01M 10/058* (2010.01)
*H01M 10/42* (2006.01)

(52) U.S. Cl.
CPC ......... *G01L 5/0038* (2013.01); *H01M 10/058* (2013.01); *H01M 10/0525* (2013.01); *H01M 10/4285* (2013.01); *Y10T 29/49004* (2015.01); *Y10T 29/53135* (2015.01)

(58) Field of Classification Search
CPC ......... H01M 2200/00; H01M 10/4285; H01M 2010/4271; H01M 10/441; H01M 10/486; H01M 50/24; H01M 50/258; H02J 7/0029; H02H 3/044; Y10T 29/53135; Y10T 29/49004
USPC ....... 29/593, 428, 623.1, 705, 708, 730, 731
See application file for complete search history.

(56) References Cited

U.S. PATENT DOCUMENTS

| | | | |
|---|---|---|---|
| 9,299,973 B2 * | 3/2016 | Kinoshita | ........... H01M 50/543 |
| 9,985,324 B2 * | 5/2018 | Loew | ................ H01M 10/6556 |
| 10,446,890 B2 | 10/2019 | Yoshida et al. | |

FOREIGN PATENT DOCUMENTS

| | | |
|---|---|---|
| JP | 2008-270460 A | 11/2008 |
| JP | 2017-076556 A | 4/2017 |

* cited by examiner

*Primary Examiner* — Thiem D Phan
(74) *Attorney, Agent, or Firm* — Sughrue Mion, PLLC

(57) ABSTRACT

Provided is a fixed-state testing device including a pressing part that presses a battery, a load detection part that detects a pressing load with which the battery is pressed, and a determination part that determines whether the state of fixing of the battery to a retention hole is good or bad. The determination part determines the fixed state of the battery to be good when the battery is able to maintain the pressing load within a first test load range for a first pressing time and, moreover, to thereafter maintain the pressing load within a second test load range of which an upper limit load is smaller than a lower limit load of the first test load range for a second pressing time.

5 Claims, 11 Drawing Sheets

FIXED-STATE TESTING METHOD, AND MANUFACTURING METHOD OF BATTERY PACK

INCORPORATION BY REFERENCE

This is a divisional of U.S. patent application Ser. No. 16/596,121, filed Oct. 8, 2019, which claims priority of Japanese Patent Application No. 2018-221610 filed on Nov. 27, 2018 including the specification, drawings and abstract, which are incorporated herein by reference in their entirety.

BACKGROUND

1. Technical Field

The present disclosure relates to a fixed-state testing device and a fixed-state testing method that are used to test a battery module including a battery and a battery retaining member having a retention hole in which the battery is inserted and fixed as to whether the state of fixing of the battery to the retention hole is good or bad, and further relates to a manufacturing method of a battery pack including this battery module.

2. Description of Related Art

There is a known battery module that includes a plurality of cylindrical batteries (hereinafter also referred to simply as "batteries") and a battery retaining member having a plurality of retention holes in which the batteries are respectively inserted and fixed. For example, Japanese Patent Application Publication No. 2017-076556 (JP 2017-076556 A) discloses such a battery module (see claim 1, FIG. 1,etc. of JP 2017-076556 A). In the battery module of JP 2017-076556 A, each battery is inserted into a retention hole with a clearance fit and an adhesive is packed into the clearance between the battery and the retention hole to thereby fix the battery to the retention hole (see paragraph [0013] of JP 2017-076556 A).

SUMMARY

In such a battery module, however, fixation of some batteries to the retention holes may become insecure due to poor bonding, for example. It has been found that those batteries that are insecurely fixed may shift (move relative to the retention holes) when the battery module is subjected to shock or vibration while in use etc. To prevent this problem, the present inventor has considered testing whether the fixed state of a battery fixed to a retention hole of a battery retaining member is good or bad.

Having been contrived in view of these circumstances, the present disclosure provides a fixed-state testing device that can appropriately test whether the fixed state of a battery fixed to a retention hole of a battery retaining member is good or bad, a fixed-state testing method that can appropriately test whether the fixed state of a battery fixed to a retention hole of a battery retaining member is good or bad, and a manufacturing method of a battery pack that can appropriately test whether the fixed state of a battery fixed to a retention hole of a battery retaining member is good or bad.

A first aspect of the present disclosure to solve the above problem is a fixed-state testing device that tests a battery module including a battery and a battery retaining member having a retention hole in which the battery is inserted and fixed as to whether the state of fixing of the battery to the retention hole is good or bad. This fixed-state testing device includes: a pressing part that presses the battery toward one side in an axial direction along a hole axis of the retention hole; a load detection part that detects a pressing load Fa with which the pressing part presses the battery; and a determination part that determines whether the state of fixing of the battery to the retention hole is good or bad. The determination part determines the fixed state of the battery to be good when the battery pressed toward the one side by the pressing part is able to maintain the pressing load Fa detected by the load detection part within a first test load range FE1 for a first pressing time t1 and, moreover, to thereafter maintain the pressing load Fa within a second test load range FE2 of which an upper limit load $F2c$ is smaller than a lower limit load $F1d$ of the first test load range FE1 ($F2c<F1d$) for a second pressing time t2.

The present inventor has first considered, as a fixed-state testing device that tests whether the fixed state of a battery fixed to a retention hole of a battery retaining member is good or bad, a fixed-state testing device that applies the pressing load Fa within the first test load range FE1 to a battery fixed to a retention hole and determines that the state of fixing of this battery to the retention hole is good when the pressing load Fa is within the first test load range FE1 at the end of the first pressing time t1, i.e., when the battery is able to maintain the pressing load Fa within the first test load range FE1 for the first pressing time t1.

When this fixed-state testing device is used, a battery that is extremely insecurely fixed to the retention hole shifts (moves relative to the retention hole) immediately after a load starts to be placed thereon, making it impossible to apply the pressing load Fa within the first test load range FE1 to this battery in the first place. Thus, such a battery cannot maintain the pressing load Fa within the first test load range FE1 for the first pressing time t1, and therefore the state of fixing of the battery to the retention hole is determined to be bad.

As for a battery that is fixed to the retention hole more securely than the above-described battery but not securely enough, the pressing load Fa within the first test load range FE1 can be applied to the battery at first, but the battery fails to maintain the fixed state before the end of the first pressing time t1, so that the pressing load Fa decreases below the lower limit load $F1d$ of the first test load range FE1 before the end of the first pressing time t1. Also in this case, the battery cannot maintain the pressing load Fa within the first test load range FE1 for the first pressing time t1, and therefore the fixed state of the battery is determined to be bad.

On the other hand, the fixed states of those batteries other than the above-described batteries that can maintain the pressing load Fa within the first test load range FE1 for the first pressing time t1 are determined to be good. However, those batteries include a battery which has failed to maintain the fixed state before the end of the first pressing time t1 but of which the fixed state is determined to be good because the pressing load Fa has exceeded the lower limit load $F1d$ of the first test load range FE1 at the end of the first pressing time t1. Such a battery cannot maintain the fixed state (is in a state of being easily moved by a small pressing load Fa) and hence is a defective product. Thus, the above-described fixed-state testing device cannot avoid the possibility that batteries of which the fixed states have been determined to be good may include some batteries of which the fixed states have become bad.

As a countermeasure, the fixed-state testing device of the present disclosure includes the pressing part, the load detection part, and the determination part, and determines the fixed state of a battery to be good when the battery pressed by the pressing part is able to maintain the pressing load Fa detected by the load detection part within the first test load range FE1 for the first pressing time t1 and, moreover, to thereafter maintain the pressing load Fa within the second test load range FE2 of which the upper limit load F2c is smaller than the lower limit load F1d of the first test load range FE1 for the second pressing time t2.

As described above, batteries that have been able to maintain the pressing load Fa within the first test load range FE1 for the first pressing time t1 include those of which the fixed states have become bad. However, such a battery of which the fixed state has become bad is unlikely to thereafter maintain the pressing load Fa within the second test load range FE2 for the second pressing time t2. Thus, the fixed-state testing device of the present disclosure can test whether the fixed state of a battery is good or bad more appropriately than the above-described testing device that determines the fixed state of a battery based only on whether or not the battery can maintain the pressing load Fa within the first test load range FE1 for the first pressing time t1.

The upper limit load F2c of the second test load range FE2 is set to be smaller than the lower limit load F1d of the first test load range FE1. Because the fixed state of a non-defective battery that has been able to maintain the fixed state while maintaining the pressing load Fa within the first test load range FE1 for the first pressing time t1 is unlikely to become bad when this battery thereafter maintains the pressing load Fa within such a second test load range FE2, this setting can reduce the possibility that the fixed state of a battery may become bad as a result of the battery's maintaining the pressing load Fa within the second test load range FE2. Thus, the above-described fixed-state testing device can appropriately test the fixed state of a battery fixed to the retention hole of the battery retaining member.

The fixed-state testing device may be either a testing device that tests one battery at a time as to whether the fixed state is good or bad, or a testing device that tests a plurality of batteries at the same time as to whether the fixed state is good or bad. To test whether the fixed state of a battery is good or bad more appropriately, it is preferable that the first pressing time t1 be not shorter than 0.02 sec (t1≥0.02 sec); that the second pressing time t2 be not shorter than 0.02 sec (t2≥0.02 sec); and that the lower limit load F2d of the second test load range FE2 be not smaller than a tenth of the lower limit load F1d of the first test load range FE1 (F2d≥F1d/10). It is also preferable that the width of the first test load range FE1 (upper limit load F1c−lower limit load F1d) and the width of the second test load range FE2 (upper limit load F2c−lower limit load F2d) be equal.

In the above-described fixed-state testing device, the second pressing time t2 may be shorter than the first pressing time t1 (t2<t1).

The test of whether or not the battery can maintain the pressing load Fa within the second test load range FE2 for the second pressing time t2 is performed, as described above, to detect a battery that has failed to maintain the fixed state while maintaining the pressing load Fa within the first test load range FE1 for the first pressing time t1. Therefore, the second pressing time t2 need not be long. On the other hand, setting a short second pressing time t2 can reduce the test time.

In any one of the above-described fixed-state testing devices, the battery module may include m batteries, with m being a natural number not smaller than two, and the pressing part, the load detection part, and the determination part may be configured to allow n batteries, with n being a natural number not smaller than two nor larger than m, to be tested at the same time as to whether the fixed state is good or bad.

This fixed-state testing device can test a plurality of (n) batteries at the same time as to whether the fixed state is good or bad. Accordingly, the total test time (the time required to test all the batteries included in the battery module) can be reduced when this fixed-state testing device is used, compared with when a testing device that tests one battery at a time as to whether the fixed state is good or bad is used.

Another aspect of the present disclosure is a fixed-state testing method for testing a battery module including a battery and a battery retaining member having a retention hole in which the battery is inserted and fixed as to whether the state of fixing of the battery to the retention hole is good or bad. This fixed-state testing method includes: a first test step of pressing the battery toward one side in an axial direction along a hole axis of the retention hole and testing whether or not the battery is able to maintain a pressing load Fa with which the battery is pressed within a first test load range FE1 for a first pressing time t1; a second test step of, after the first test step, testing whether or not the battery is able to maintain the pressing load Fa within a second test load range FE2 of which an upper limit load F2c is smaller than a lower limit load F1d of the first test load range FE1 (F2c<F1d) for a second pressing time t2; and a determination step of determining the fixed state of the battery to be good when the battery has been able to maintain the pressing load Fa in both the first test step and the second test step.

In this fixed-state testing method, it is tested in the first test step whether or not the battery can maintain the pressing load Fa within the first test load range FE1 for the first pressing time t1, and it is tested in the second test step whether or not the battery can maintain the pressing load Fa within the second test load range FE2 of which the upper limit load F2c is smaller than the lower limit load F1d of the first test load range FE1 for the second pressing time t2. Then, it is determined in the determination step that the fixed state of the battery is good when the battery has been able to maintain the pressing load Fa in both the first test step and the second test step.

As described above, batteries that have been able to maintain the pressing load Fa within the first test load range FE1 for the first pressing time t1 include those of which the fixed states have become bad. However, such a battery of which the fixed state has become bad is unlikely to thereafter maintain the pressing load Fa within the second test load range FE2 for the second pressing time t2. Thus, the fixed-state testing method of the present disclosure can test whether the fixed state of a battery is good or bad more appropriately than a testing method in which the fixed state of a battery is determined based only on whether or not the battery can maintain the pressing load Fa within the first test load range FE1 for the first pressing time t1.

As described above, the upper limit load F2c of the second test load range FE2 is set to be smaller than the lower limit load F1d of the first test load range FE1. Because the fixed state of a non-defective battery that has been able to maintain the fixed state while maintaining the pressing load Fa within the first test load range FE1 for the first pressing time t1 is unlikely to become bad when this battery thereafter maintains the pressing load Fa within such a second test load range FE2, this setting can reduce the possibility that the fixed state of a battery may become bad as a result of the battery's maintaining the pressing load Fa within the second test load range FE2. Thus, the above-described fixed-state testing method can appropriately test the fixed state of a battery fixed to the retention hole of the battery retaining member.

When the battery module includes a plurality of batteries, for example, the first test step, the second test step, and the determination step can be performed on one battery at a time. Alternatively, the first test step, the second test step, and the determination step can be performed on all or some of the batteries included in the battery module at the same time. To test whether the fixed state of a battery is good or bad more appropriately, it is preferable that, as described above, the first pressing time t1 be not shorter than 0.02 sec (t1≥0.02 sec); that the second pressing time t2 be not shorter than 0.02 sec (t2≥0.02 sec); and that the lower limit load F2$d$ of the second test load range FE2 be not smaller than a tenth of the lower limit load F1$d$ of the first test load range FE1 (F2$d$≥F1$d$/10). It is also preferable that the width of the first test load range FE1 (upper limit load F1$c$–lower limit load F1$d$) and the width of the second test load range FE2 (upper limit load F2$c$–lower limit load F2$d$) be equal.

In the above-described fixed-state testing method, the second pressing time t2 may be set to be shorter than the first pressing time t1 (t2<t1).

The test of whether or not the battery can maintain the pressing load Fa within the second test load range FE2 for the second pressing time t2 is performed, as described above, to detect a battery that has failed to maintain the fixed state while maintaining the pressing load Fa within the first test load range FE1 for the first pressing time t1. Therefore, the second pressing time t2 need not be long. On the other hand, setting a short second pressing time t2 can reduce the test time.

In any one of the above-described fixed-state testing methods, the battery module may include m batteries, with m being a natural number not smaller than two, and the first test step, the second test step, and the determination step may be performed on n batteries at the same time, with n being a natural number not smaller than two nor larger than m.

In this fixed-state testing method, a plurality of (n) batteries is tested at the same time as to whether the fixed state is good or bad. Accordingly, the total test time (the time required to test all the batteries included in the battery module) can be reduced when this fixed-state testing method is used, compared with when a testing method in which one battery is tested at a time as to whether the fixed state is good or bad is used.

In any one of the above-described fixed-state testing methods, the battery retained in the retention hole may be a film-sheathed battery having a battery main body covered with a heat-shrinkable film around a periphery in a radial direction orthogonal to an axial direction along a battery axis, and the heat-shrinkable film of the film-sheathed battery may be fixed to the retention hole.

In this battery module, the battery is a film-sheathed battery and the heat-shrinkable film of the film-sheathed battery is fixed to the retention hole of the battery retaining member. In such a battery module, the battery main body is merely covered with the heat-shrinkable film and therefore moves easily relative to the heat-shrinkable film. Even when the heat-shrinkable film is firmly fixed to the retention hole so as not to move relative to the retention hole, the battery main body moves easily relative to the heat-shrinkable film and the retention hole. It is therefore especially preferable to appropriately test the fixed states of the batteries (specifically, the battery main bodies) through the first test step, the second test step, and the determination step and thereby eliminate a battery module in which the fixed state of any battery has turned out to be bad.

Yet another aspect of the present disclosure is a manufacturing method of a battery pack that includes a battery module including a battery and a battery retaining member having a retention hole in which the battery is inserted and fixed. This manufacturing method includes: an insertion and fixation step of inserting the battery into the retention hole of the battery retaining member and fixing the battery; a fixed-state testing step of testing whether the state of fixing of the battery to the retention hole is good or bad by any one of the above-described fixed-state testing methods; and an assembly step of assembling the battery pack by using the battery module for which the fixed state of the battery has been determined to be good in the fixed-state testing step.

In this manufacturing method of a battery pack, a battery is inserted into the retention hole of the battery retaining member and fixed in the insertion and fixation step, and then whether the state of fixing of the battery to the retention hole is good or bad is tested by the above-described fixed-state testing method in the fixed-state testing step. Thus, whether the fixed state of the battery is good or bad can be appropriately tested. Then, in the assembly step, a battery pack is assembled by using a battery module for which the fixed state of the battery has been determined to be good in the fixed-state testing step, so that a highly reliable battery pack can be manufactured. Examples of the method of fixing the battery to the retention hole in the "insertion and fixation step" include fixing by an adhesive, fixing by adhesive tape, and fixing by press-fitting.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
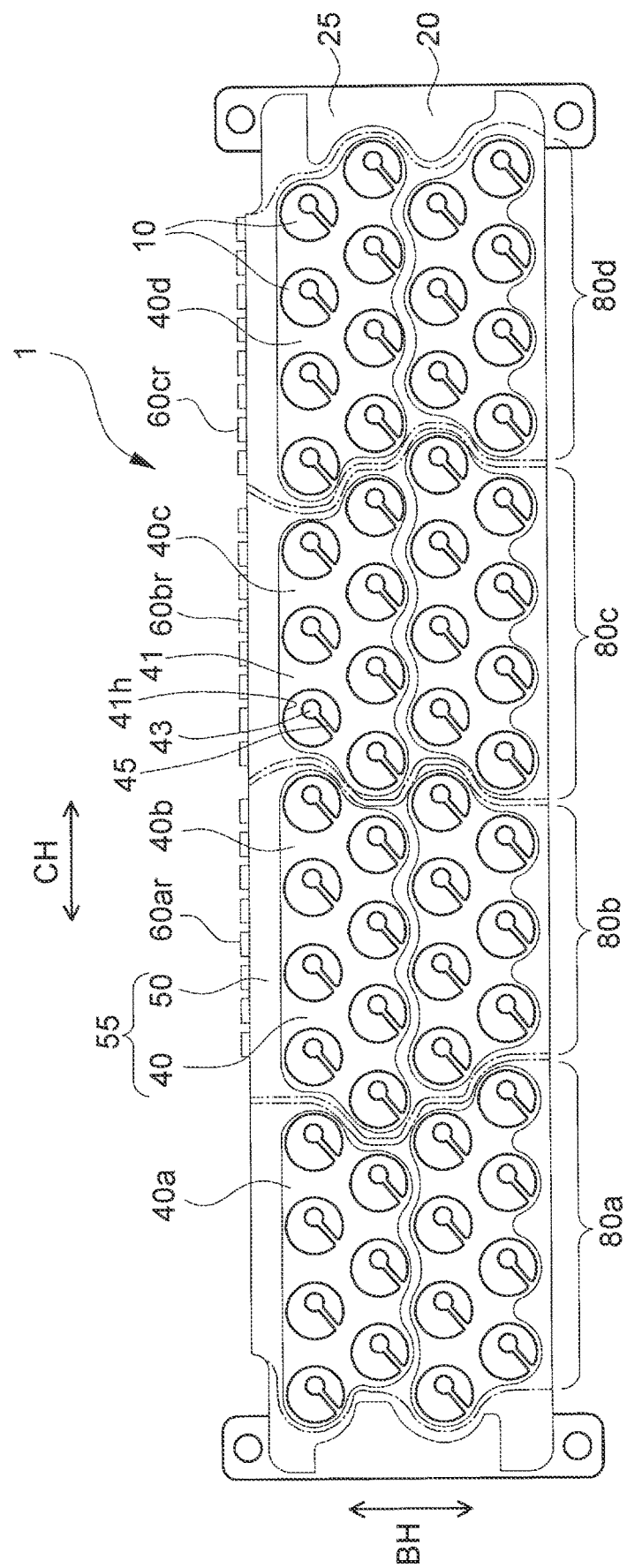
FIG. 1 is a top view of a battery pack according to an embodiment.
Figure 2:
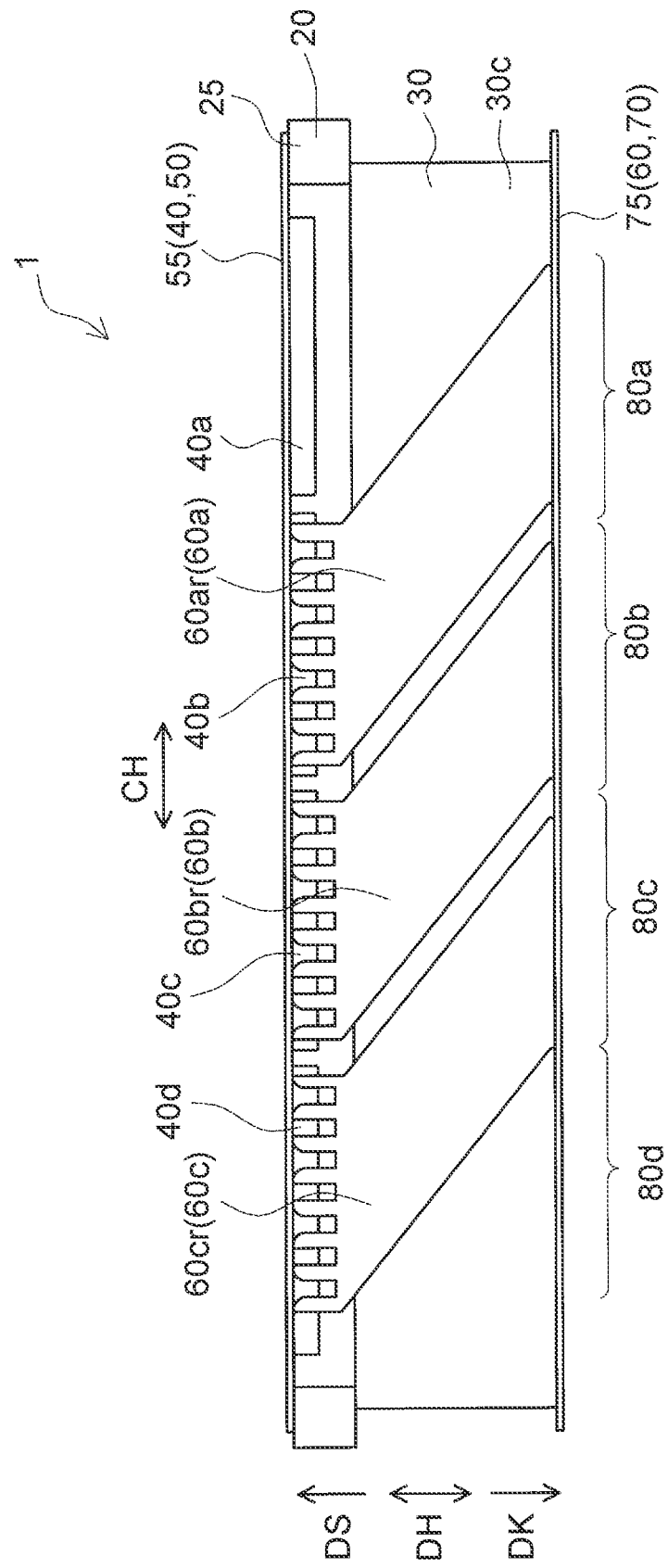
FIG. 2 is a side view of the battery pack according to the embodiment.
Figure 3:
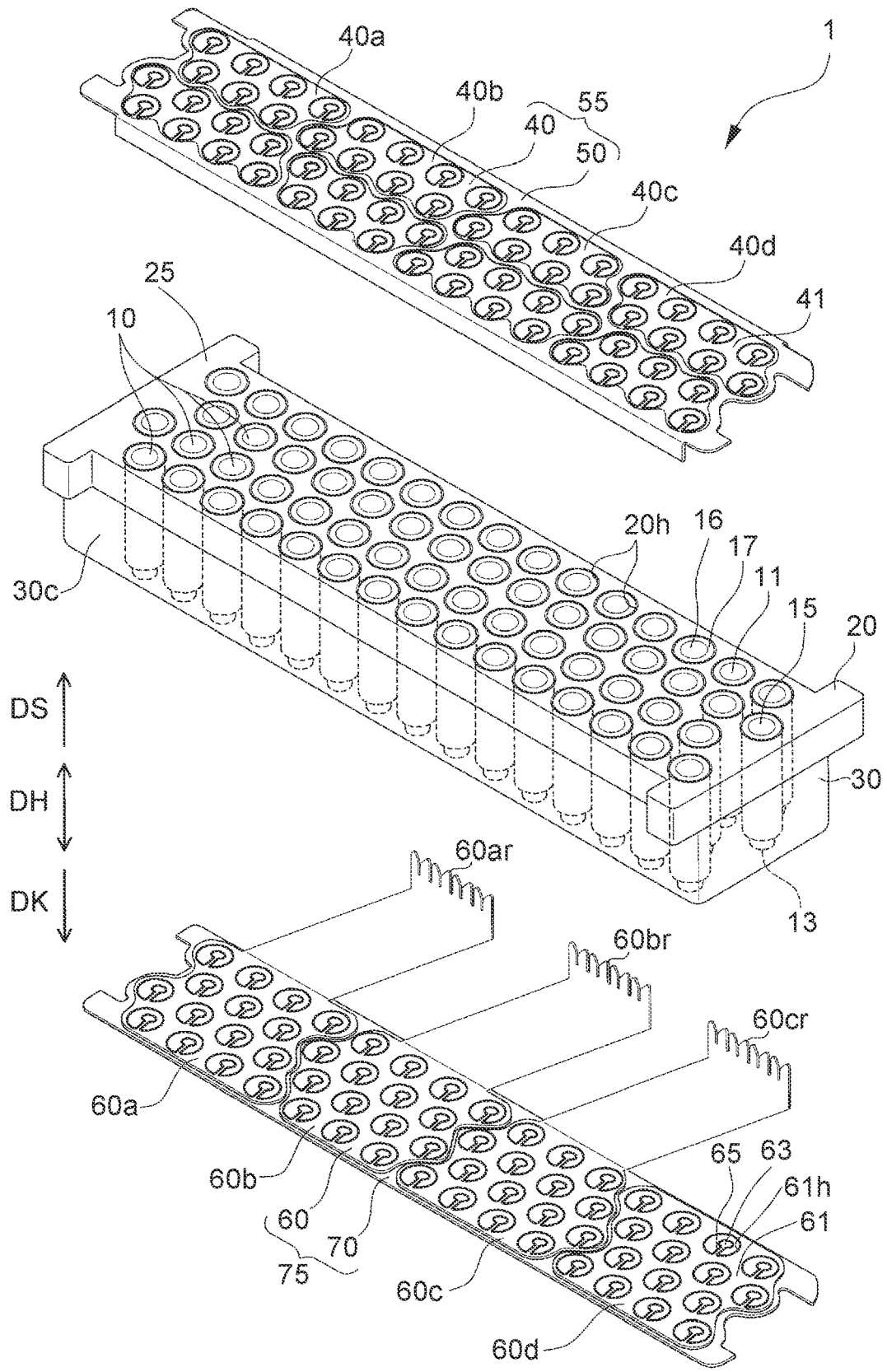
FIG. 3 is an exploded perspective view of the battery pack according to the embodiment.
Figure 4:
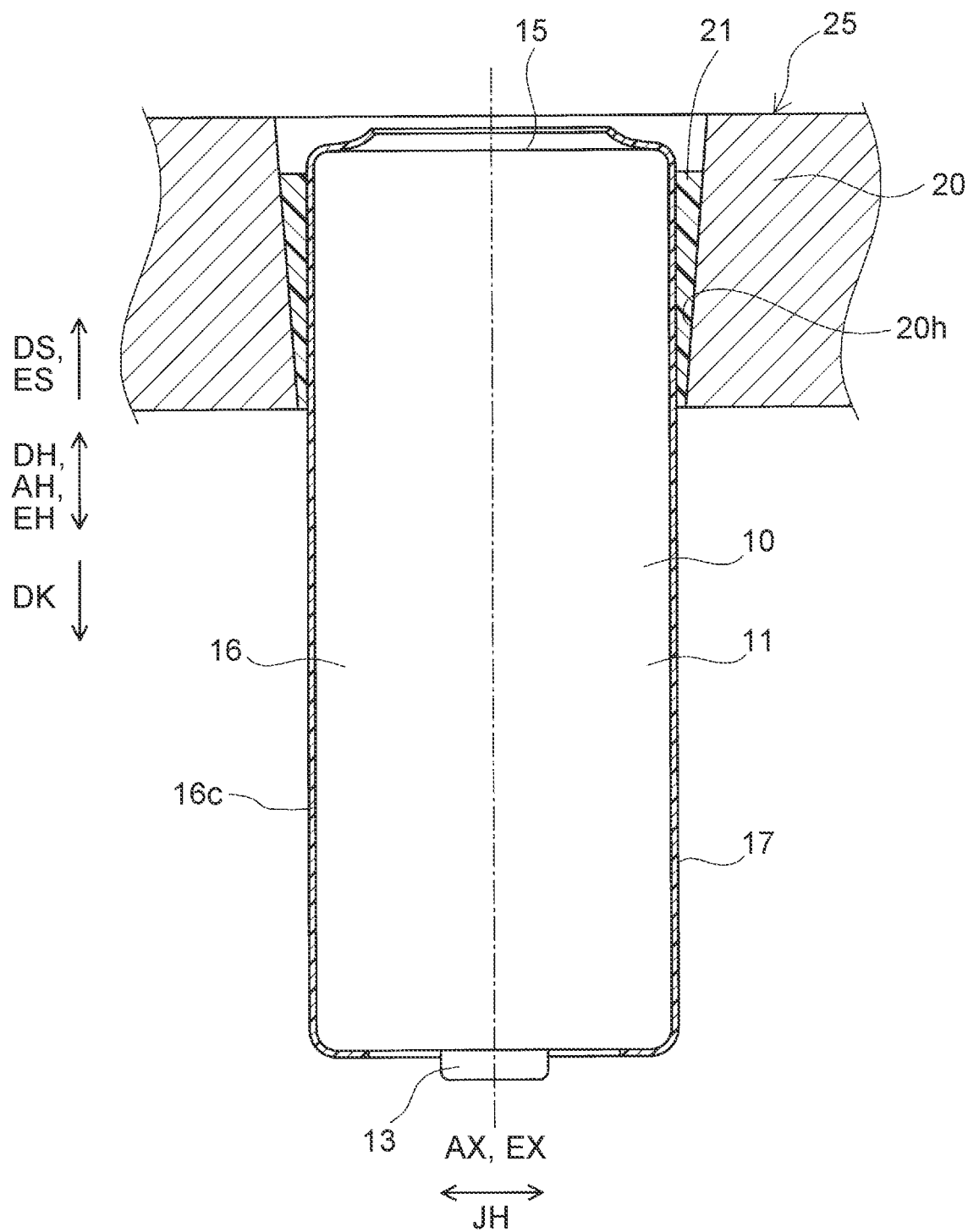
FIG. 4 is a partial cutaway sectional view according to the embodiment, showing a state where a battery is fixed to a retention hole of a battery retaining member.
Figure 5:
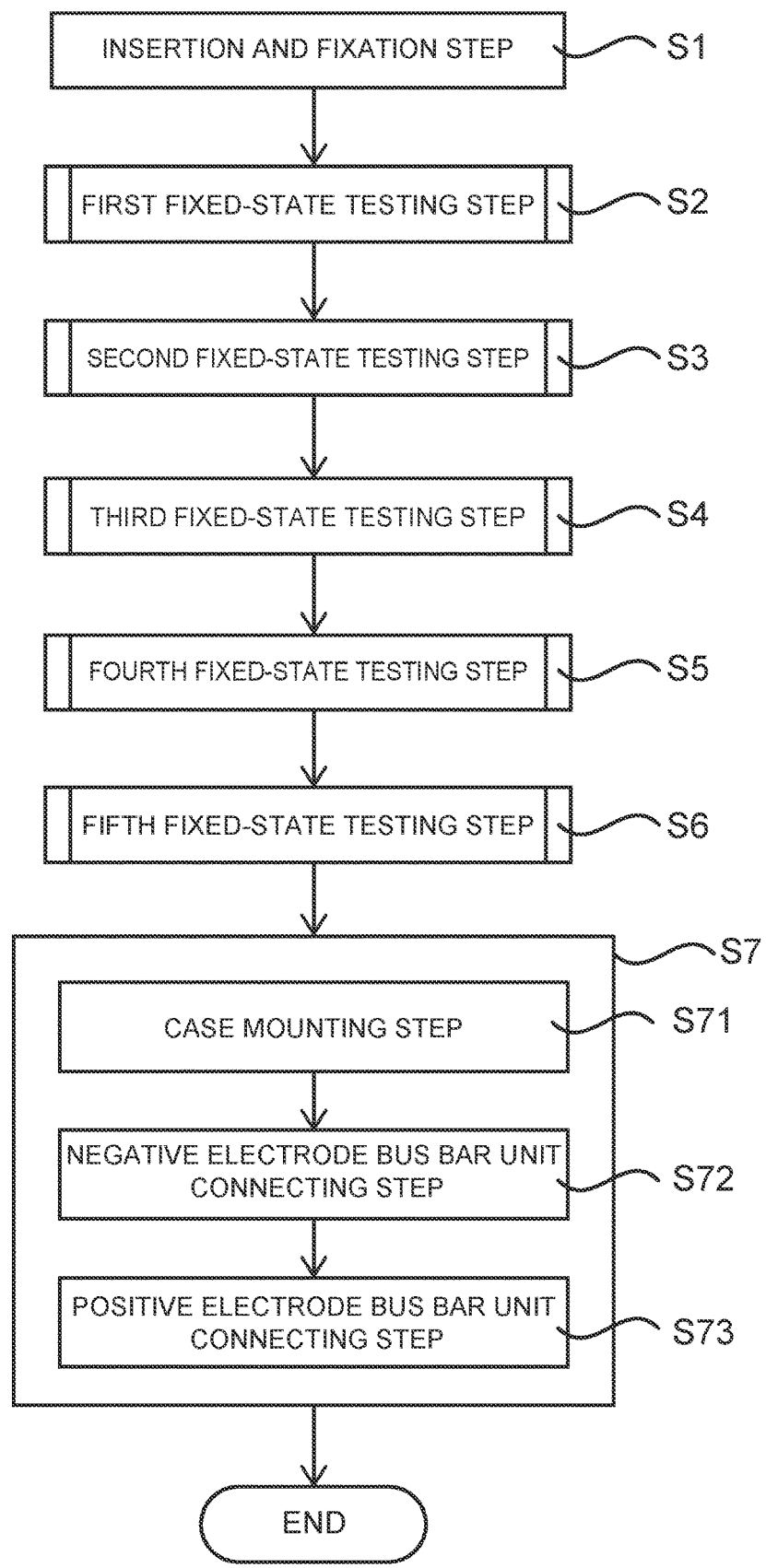
FIG. 5 is a flowchart of a manufacturing method of a battery pack according to the embodiment.
Figure 6:
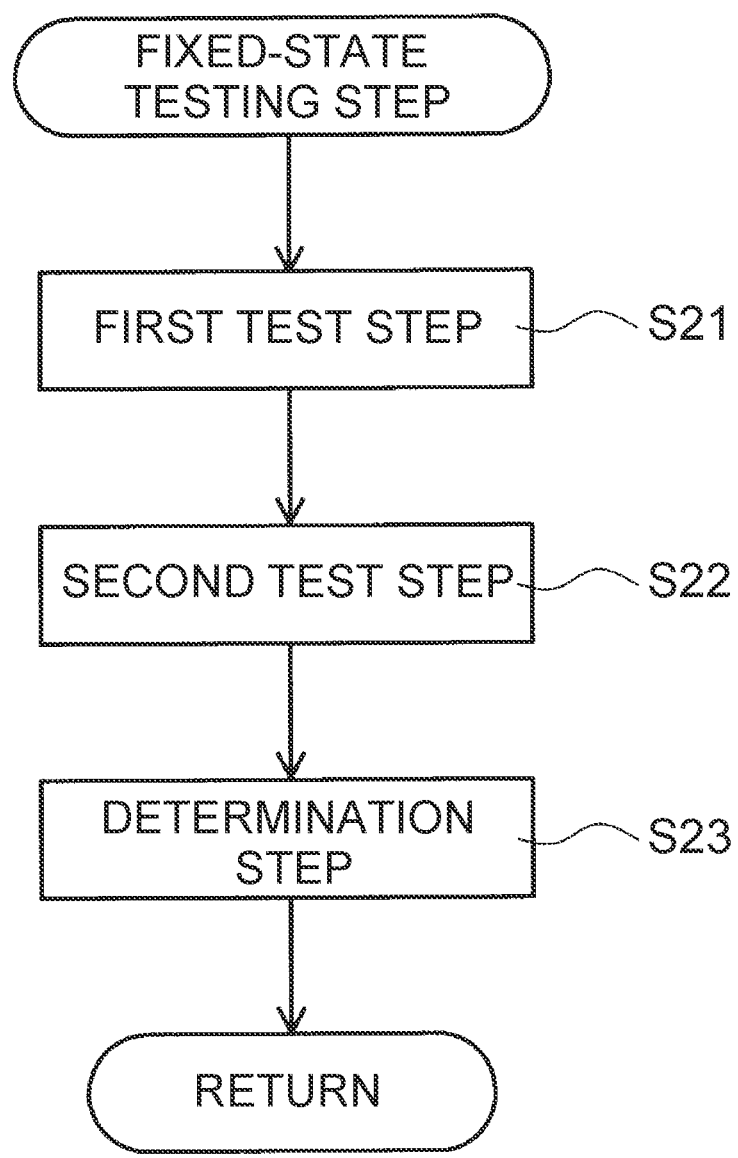
FIG. 6 is a flowchart of a sub-routine of a fixed-state testing step according to the embodiment.
Figure 7:
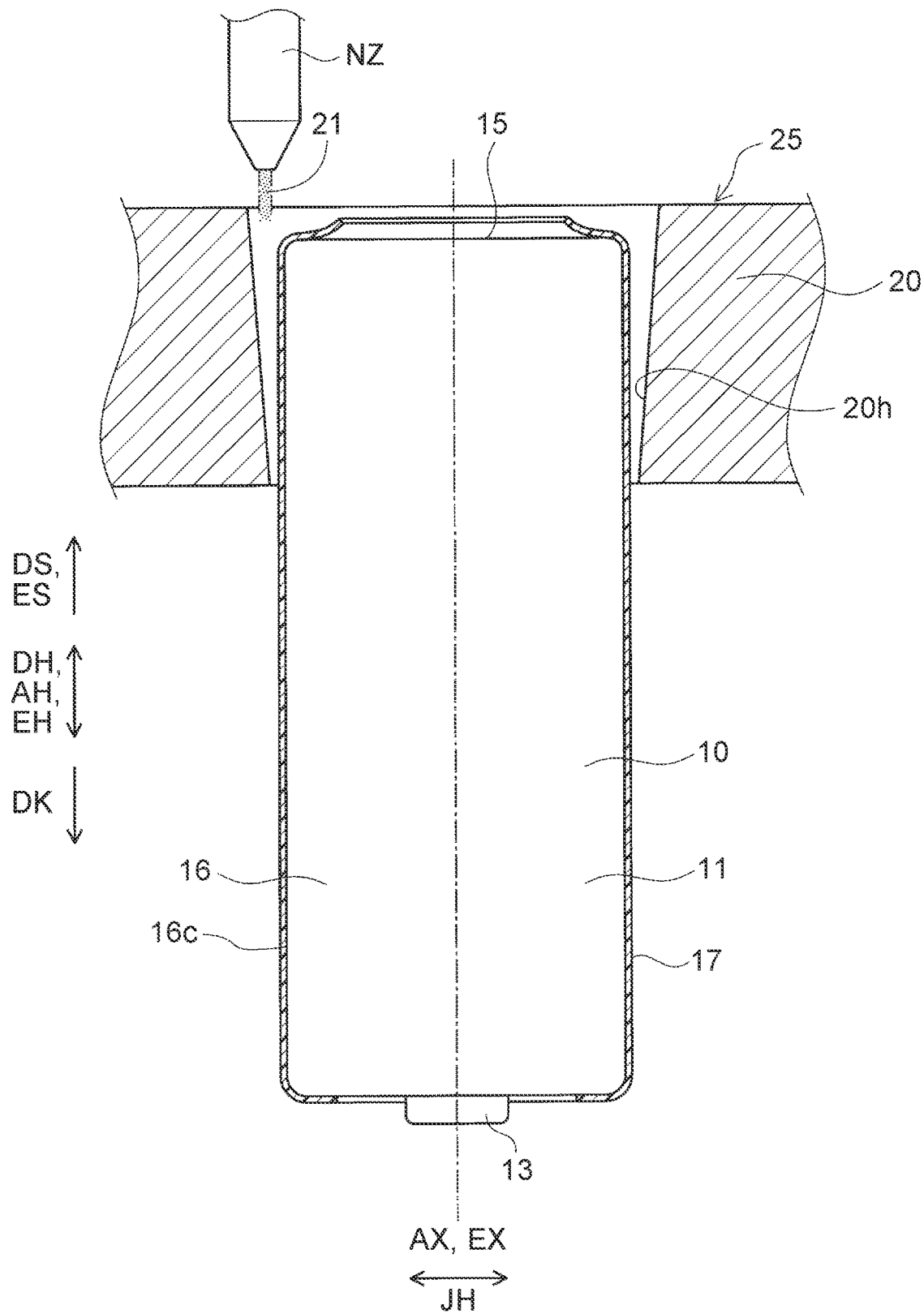
FIG. 7 is an illustration according to the embodiment, showing how the battery is fixed to the retention hole of the battery retaining member.
Figure 8:
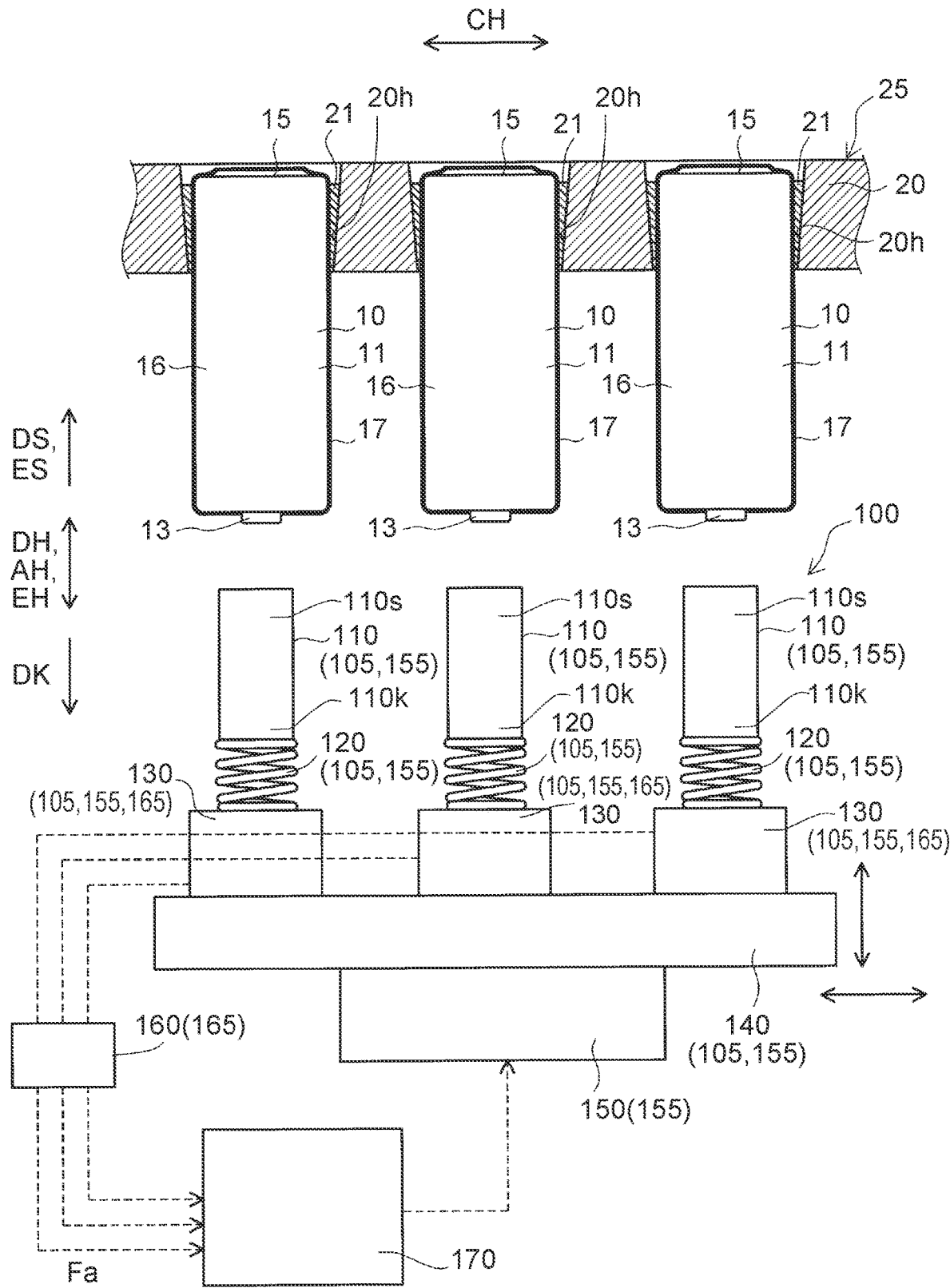
FIG. 8 is an illustration showing a fixed-state testing device according to the embodiment.
Figure 9:
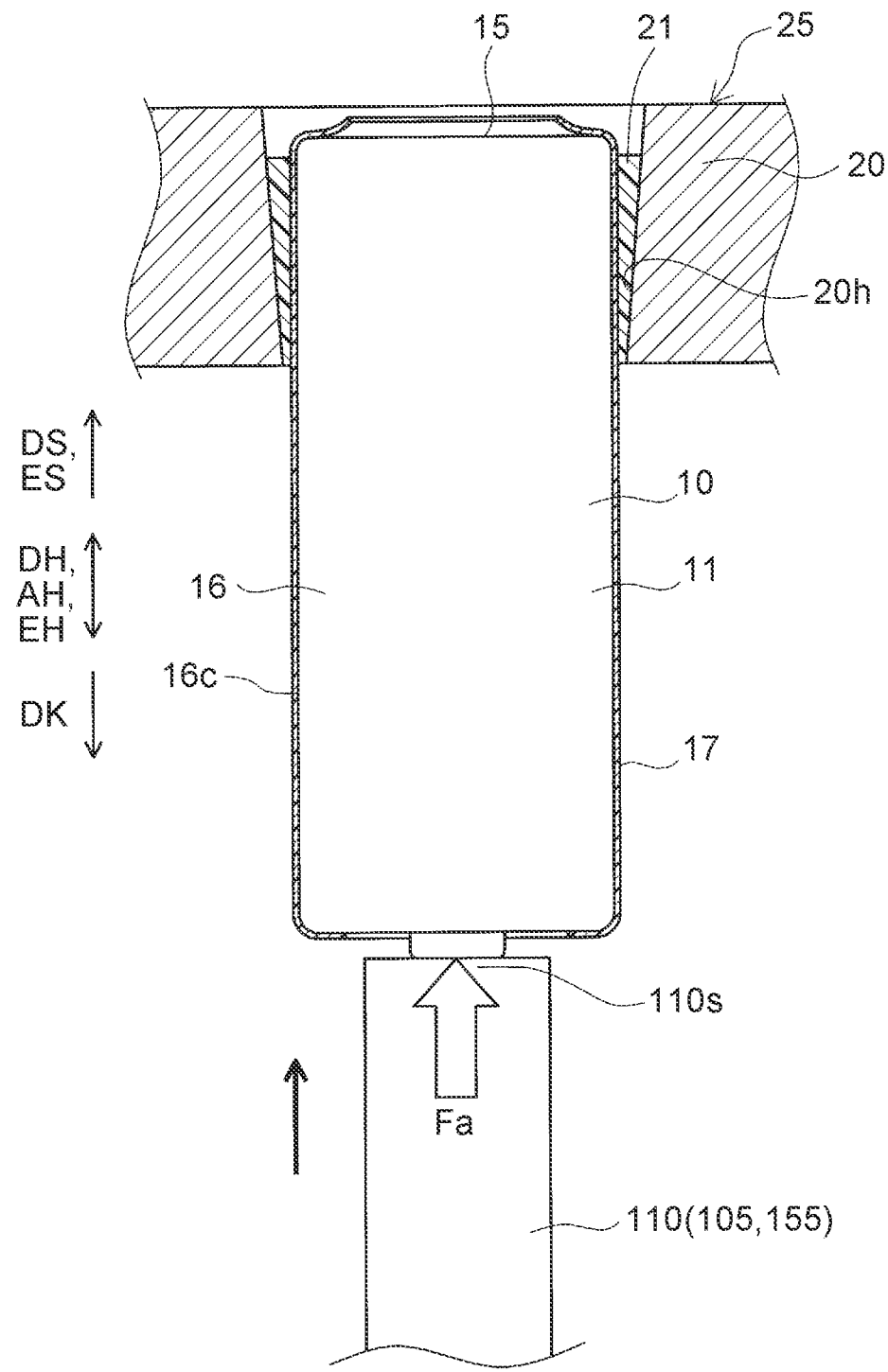
FIG. 9 is an illustration according to the embodiment, showing how the battery is pressed by a pressing rod.

An embodiment of the present disclosure will be described below with reference to the drawings. FIG. 1 to FIG. 3 are a top view, a side view, and an exploded perspective view, respectively, of a battery pack 1 according to the embodiment. FIG. 4 is a partial cutaway sectional view of a state where a cylindrical battery 10 is fixed to a battery retaining member 20. For the following description, a width direction BH, a length direction CH, and a height direction DH of the battery pack 1 are defined as the directions shown in FIG. 1 to FIG. 4. The battery pack 1 is an in-vehicle battery pack that is installed in a vehicle such as a hybrid vehicle, a plug-in hybrid vehicle, or an electric vehicle. The battery pack 1 includes: a battery module 25 composed of a plurality of (in this embodiment, m=60) cylindrical batteries (hereinafter also referred to simply as "batteries") 10 and the battery retaining member 20 that retains the batteries 10; a module case 30; a negative electrode bus bar unit 55; and a positive electrode bus bar unit 75.

Of these components, the battery 10 is a film-sheathed battery having a battery main body 16 covered with a heat-shrinkable film 17. The battery main body 16 is a cylindrical (columnar) sealed lithium-ion secondary battery (specifically, an 18650 lithium-ion secondary battery). The battery main body 16 has a cylindrical battery case 11 made of metal (in this embodiment, carbon steel), and an electrode body (not shown), formed by placing a strip-shaped positive electrode plate and a strip-shaped negative electrode plate one on top of the other alternately with a pair of strip-shaped separators and rolling this electrode plate-separator assembly into a cylindrical shape, that is housed inside the battery case 11 along with a non-aqueous electrolyte (not shown). On the other hand, the heat-shrinkable film 17 is made of a resin having electrical insulation properties and heat shrinkability, and has a shape of a cylinder that covers a periphery 16c of the battery main body 16 in a radial direction JH orthogonal to an axial direction AH along a battery axis AX. (The axial direction AH is a direction orthogonal to the sheet of FIG. 1 and the up-down direction in FIG. 2 to FIG. 4.)

A protruding positive electrode terminal 13 that is connected to the positive electrode plate of the electrode body inside the battery and conducts electricity is provided at one end of the battery main body 16 in the axial direction AH (the end on the lower side in FIG. 2 to FIG. 4). On the other hand, a bottom surface of the battery case 11 located at the other end of the battery main body 16 in the axial direction AH (the end on the upper side in FIG. 2 to FIG. 4) forms a disc-shaped negative electrode terminal 15 that is connected to the negative electrode plate of the electrode body inside the battery and conducts electricity. The batteries 10 included in the battery module 25 are each retained by the battery retaining member 20, with the negative electrode terminal 15 facing an upper side DS in the height direction DH and the positive electrode terminal 13 facing a lower side DK in the height direction DH, such that the batteries 10 are parallel to and level with one another.

The battery retaining member 20 is a member made of metal (specifically, aluminum) and has a plurality of (specifically, 60) circular retention holes 20h that extends through the battery retaining member 20 in the height direction DH. As seen from the upper side DS or the lower side DK, the retention holes 20h are arrayed in 4-by-15 rows in a staggered manner. Each retention hole 20h has a tapered shape (truncated conical shape) of which the inside diameter increases toward one side ES in an axial direction EH along a hole axis EX (upper side DS). Part of the side of the negative electrode terminal 15 (the upper side in FIG. 2 to FIG. 4) of the battery 10 is inserted into each retention hole 20h in a state where the hole axis EX and the battery axis AX coincide with each other. On the other hand, the side of the positive electrode terminal 13 (the lower side in FIG. 2 to FIG. 4) of the battery 10 protrudes toward the lower side DK from the battery retaining member 20. An adhesive 21 is packed into a clearance between the heat-shrinkable film 17 of each battery 10 and the retention hole 20h. Thus, the batteries 10 are fixed to the retention holes 20h of the battery retaining member 20 in a state of being arrayed in a staggered manner as seen from the upper side DS or the lower side DK.

The module case 30 is a resin case, and is disposed on the lower side DK of the battery module 25 and fixed to the battery retaining member 20 of the battery module 25. The module case 30 surrounds a periphery of a portion of each battery 10 protruding toward the lower side DK from the battery retaining member 20.

Next, the negative electrode bus bar unit 55 will be described. The negative electrode bus bar unit 55 integrally has four negative electrode bus bars 40 (a first negative electrode bus bar 40a, a second negative electrode bus bar 40b, a third negative electrode bus bar 40c, and a fourth negative electrode bus bar 40d) and a resin negative electrode retaining member 50 that retains these negative electrode bus bars 40. The negative electrode bus bar unit 55 is disposed on the upper side DS of the battery module 25 and fixed to the battery retaining member 20 of the battery module 25. The negative electrode bus bars 40 are formed by performing press-cutting on a metal plate material. Each negative electrode bus bar 40 is connected to the negative electrode terminals 15 of 15 batteries 10. Thus, in each group of 15 batteries 10, the negative electrode terminals 15 are electrically conductive with one another through the negative electrode bus bar 40.

Specifically, each negative electrode bus bar 40 has a negative electrode bus bar main body 41 which has a shape of a plate that covers 15 batteries 10 from the upper side DS and in which circular through-holes 41h are provided at positions corresponding to these batteries 10. Inside each through-hole 41h of the negative electrode bus bar main body 41, a disc-shaped negative electrode connection portion 43 and a strip-shaped negative electrode coupling portion 45 that connects the negative electrode connection portion 43 and the negative electrode bus bar main body 41 to each other are provided. The negative electrode coupling portion 45 extends in a strip shape from a rim of the through-hole 41h of the negative electrode bus bar main body 41 toward a radially inner side, obliquely toward the lower side DK, with the negative electrode connection portion 43 being provided at a leading end of the negative electrode coupling portion 45. The negative electrode connection portion 43 is connected (welded) to the negative electrode terminal 15 of the battery 10.

The positive electrode bus bar unit 75 integrally has four positive electrode bus bars 60 (a first positive electrode bus bar 60a, a second positive electrode bus bar 60b, a third positive electrode bus bar 60c, and a fourth positive electrode bus bar 60d) and a resin positive electrode retaining member 70 that retains these positive electrode bus bars 60. The positive electrode bus bar unit 75 is disposed on the lower side DK of the module case 30 and fixed to the module case 30. The positive electrode bus bars 60 are formed by performing press-cutting on a metal plate material. Each positive electrode bus bar 60 is connected to the positive electrode terminals 13 of 15 batteries 10. Thus, in each group of 15 batteries 10, the positive electrode terminals 13 are electrically conductive with one another through the positive electrode bus bar 60.

Specifically, each positive electrode bus bar 60 has a positive electrode bus bar main body 61 which has a shape of a plate that covers 15 batteries 10 from the lower side DK and in which circular through-holes 61h are provided at positions corresponding to these batteries 10. Inside each through-hole 61h of the positive electrode bus bar main body 61, a disc-shaped positive electrode connection portion 63 and a strip-shaped positive electrode coupling portion 65 that connects the positive electrode connection portion 63 and the positive electrode bus bar main body 61 to each other are provided. The positive electrode coupling portion 65 extends in a strip shape from a rim of the through-hole 61h of the positive electrode bus bar main body 61 toward a radially inner side, obliquely toward the upper side DS, with the positive electrode connection portion 63 being provided at a leading end of the positive electrode coupling portion 65. The positive electrode connection portion 63 is connected (welded) to the positive electrode terminal 13 of the battery 10.

In the battery pack 1 of this embodiment, 15 batteries 10 are electrically connected in parallel to one another through one negative electrode bus bar 40 and one positive electrode bus bar 60 to form one battery block. A total of four battery blocks (a first battery block 80a, a second battery block 80b, a third battery block 80c, and a fourth battery block 80d) are electrically connected in series to one another.

Specifically, the first battery block 80a is composed of the first negative electrode bus bar 40a, the first positive electrode bus bar 60a, and 15 batteries 10. The second battery block 80b is composed of the second negative electrode bus bar 40b, the second positive electrode bus bar 60b, and 15 batteries 10. The third battery block 80c is composed of the third negative electrode bus bar 40c, the third positive electrode bus bar 60c, and 15 batteries 10. The fourth battery block 80d is composed of the fourth negative electrode bus bar 40d, the fourth positive electrode bus bar 60d, and 15 batteries 10.

A plate-shaped lead part 60ar that extends from the first positive electrode bus bar 60a of the first battery block 80a obliquely toward the upper side DS along one of a pair of side surfaces 30c of the module case 30 that have larger areas is connected to the second negative electrode bus bar 40b of the second battery block 80b located next to the first battery block 80a. A plate-shaped lead part 60br that extends from the second positive electrode bus bar 60b of the second battery block 80b obliquely toward the upper side DS along the side surface 30c of the module case 30 is connected to the third negative electrode bus bar 40c of the third battery block 80c located next to the second battery block 80b. Moreover, a plate-shaped lead part 60cr that extends from the third positive electrode bus bar 60c of the third battery block 80c obliquely toward the upper side DS along the side surface 30c of the module case 30 is connected to the fourth negative electrode bus bar 40d of the fourth battery block 80d located next to the third battery block 80c.

Next, a manufacturing method of the battery pack 1 will be described (see FIG. 5 to FIG. 11). First, a plurality of (in this embodiment, m=60) film-sheathed batteries 10 having the battery main body 16 covered with the heat-shrinkable film 17 and the battery retaining member 20 are prepared. Then, in an "insertion and fixation step S1" (see FIG. 5), the batteries 10 are inserted respectively into the retention holes 20h of the battery retaining member 20 and fixed to the retention holes 20h to form the battery module 25 (see FIG. 7 and FIG. 4).

Specifically, the battery 10 is inserted into the retention hole 20h with a clearance fit from the lower side DK of the battery retaining member 20, with the negative electrode terminal 15 of the battery 10 facing the upper side DS and the positive electrode terminal 13 thereof facing the lower side DK, such that the battery axis AX coincides with the hole axis EX. The battery 10 inserted into the retention hole 20h is temporarily retained by a jig (not shown). Thereafter, the adhesive 21 is injected into the clearance between the heat-shrinkable film 17 of the battery 10 and the retention hole 20h to thereby fix the heat-shrinkable film 17 of the battery 10 to the retention hole 20h. Specifically, a nozzle NZ connected to a dispenser (not shown) is disposed at a predetermined position on the upper side DS of the retention hole 20h. Then, while the nozzle NZ is revolved around the hole axis EX of the retention hole 20h, the adhesive 21 is discharged from the nozzle NZ toward the lower side DK so as to inject the adhesive 21 into the clearance between the heat-shrinkable film 17 of the battery 10 and the retention hole 20h and thereby fix the heat-shrinkable film 17 of the battery 10 to the retention hole 20h. Such insertion and fixation is performed on each of the m=60 batteries 10, and the batteries 10 are fixed to the battery retaining member 20 in a state of being parallel to and level with one another. Thus, the battery module 25 is formed.

Next, in a "first fixed-state testing step S2" (see FIG. 5 and FIG. 6), a plurality of (n=12) batteries 10 among the m=60 batteries 10 included in the battery module 25 are tested at the same time as to whether the state of fixing to the retention hole 20h is good or bad. Each of the first fixed-state testing step S2, and a second fixed-state testing step S3 to a fifth fixed-state testing step S6 to be described later is performed by using a fixed-state testing device 100 schematically shown in FIG. 8. The fixed-state testing device 100 will be described first.

The fixed-state testing device 100 includes a retaining jig (not shown) that retains the battery retaining member 20 of the battery module 25 at a predetermined position, a pressing unit 105 that presses the batteries 10 of the battery module 25, a moving mechanism 150 that three-dimensionally moves the pressing unit 105, a sensor circuit 160, and a computer 170. In this embodiment, a pressing part 155 is formed by the pressing unit 105 and the moving mechanism 150. The computer 170 corresponds to the "determination part."

Of these components, the pressing unit 105 is composed of a plurality of (in this embodiment, 12) pressing rods (pressing members) 110 that respectively press the batteries 10, a plurality of (in this embodiment, 12) springs 120, a plurality of (in this embodiment, 12) load cells (load sensors) 130, and a fixing member 140 to which the load cells 130 are fixed.

The pressing rod 110 is a round rod extending in the height direction DH. The pressing rod 110 is mounted on the fixing member 140 through the spring 120 and the load cell 130, and the pressing rod 110 moves along with the fixing member 140 as the fixing member 140 is three-dimensionally moved (moved in the width direction BH, the length direction CH, and the height direction DH) by the moving mechanism 150. A leading end portion 110s of the pressing rod 110 comes into contact with the positive electrode terminal 13 of the battery 10 from the lower side DK and presses the battery 10 toward the upper side DS (the one side ES in the axial direction EH of the retention hole 20h). On the other hand, the spring 120 is mounted on a base end portion 110k of the pressing rod 110.

The load cell 130 is disposed between the spring 120 and the fixing member 140 and connected to the sensor circuit 160. In this embodiment, a load detection part 165 that detects a pressing load Fa (N) with which the pressing rod 110 presses the battery 10 is composed of the load cell 130 and the sensor circuit 160. The sensor circuit 160 is connected to the computer 170, and is configured to be able to output the pressing load Fa detected by the load detection part 165 to the computer 170.

The fixing member 140 is a member to which the load cells 130 are fixed. The moving mechanism 150 includes a motor etc. and is configured to be able to three-dimensionally move the pressing unit 105 (the fixing member 140 and the load cells 130, the springs 120, and the pressing rods 110 mounted on the fixing member 140) in the width direction BH, the length direction CH, and the height direction DH in accordance with a command from the computer 170.

As described above, the computer 170 controls the moving mechanism 150 so as to three-dimensionally move the pressing unit 105 in the width direction BH, the length direction CH, and the height direction DH. Moreover, the computer 170 controls the moving mechanism 150 so as to move the pressing unit 105 such that the pressing rods 110 of the pressing unit 105 come respectively into contact with the batteries 10 of the battery module 25 and press the batteries 10. The computer 170 determines whether the state of fixing of each battery 10 to the retention hole 20h is good or bad.

Specifically, as will be described later, the computer 170 determines the fixed state of a battery 10 to be good when the battery 10 can maintain the pressing load Fa detected by the load detection part 165 within a first test load range FE1 (in this embodiment, from a lower limit load F1d=70 N to an upper limit load F1c=90 N) for a first pressing time t1 not shorter than 0.02 sec (in this embodiment, t1=0.4 sec) and, moreover, can thereafter maintain the pressing load Fa within a second test load range FE2 (in this embodiment, from a lower limit load F2d=40 N to an upper limit load F2c=60 N) of which the upper limit load F2c is smaller than the lower limit load F1d=70 N of the first test load range FE1 for a second pressing time t2 not shorter than 0.02 sec (in this embodiment, t2=0.1 sec) (see FIG. 11). In this embodiment, the lower limit load F2d=40 N of the second test load range FE2 is set so as to meet the condition F2d≥F1d/10 relative to the lower limit load F1d=70 N of the first test load range FE1. The width of the first test load range FE1 (upper limit load F1c−lower limit range F1d=90−70=20 N) and the width of the second test load range FE2 (upper limit load F2c−lower limit range F2d=60−40=20 N) are set to be equal.

Next, the first fixed-state testing step S2 using the fixed-state testing device 100 will be described. First, the battery retaining member 20 of the battery module 25 is retained at a predetermined position by the retaining jig (not shown) of the fixed-state testing device 100. Then, the moving mechanism 150 is controlled by a command from the computer 170 so as to move the pressing unit 105 toward the lower side DK of the battery module 25. Specifically, the pressing unit 105 is moved such that the leading end portions 110s of the pressing rods 110 are disposed on the lower side DK of the positive electrode terminals 13 of the batteries 10 to be tested while facing these positive electrode terminals 13 (see FIG. 8).

Next, in a "first test step S21" (see FIG. 6), the batteries 10 are pressed toward the upper side DS (the one side ES in the axial direction EH of the retention hole 20h), and it is tested whether or not the batteries 10 can maintain the pressing load Fa with which the batteries 10 are pressed within the first test load range FE1 (in this embodiment, from the lower limit load F1d=70 N to the upper limit load F1c=90 N) for the first pressing time t1 (in this embodiment, t1=0.4 sec). Specifically, first, the moving mechanism 150 is controlled by a command from the computer 170 so as to move the pressing unit 105 toward the upper side DS such that the leading end portions 110s of the pressing rods 110 come respectively into contact with the positive electrode terminals 13 of the batteries 10 (see FIG. 9). Subsequently, the pressing unit 105 is moved further toward the upper side DS such that the leading end portions 110s of the pressing rods 110 respectively press the batteries 10 toward the upper side DS (the one side ES in the axial direction EH of the retention hole 20h).

Figure 11:
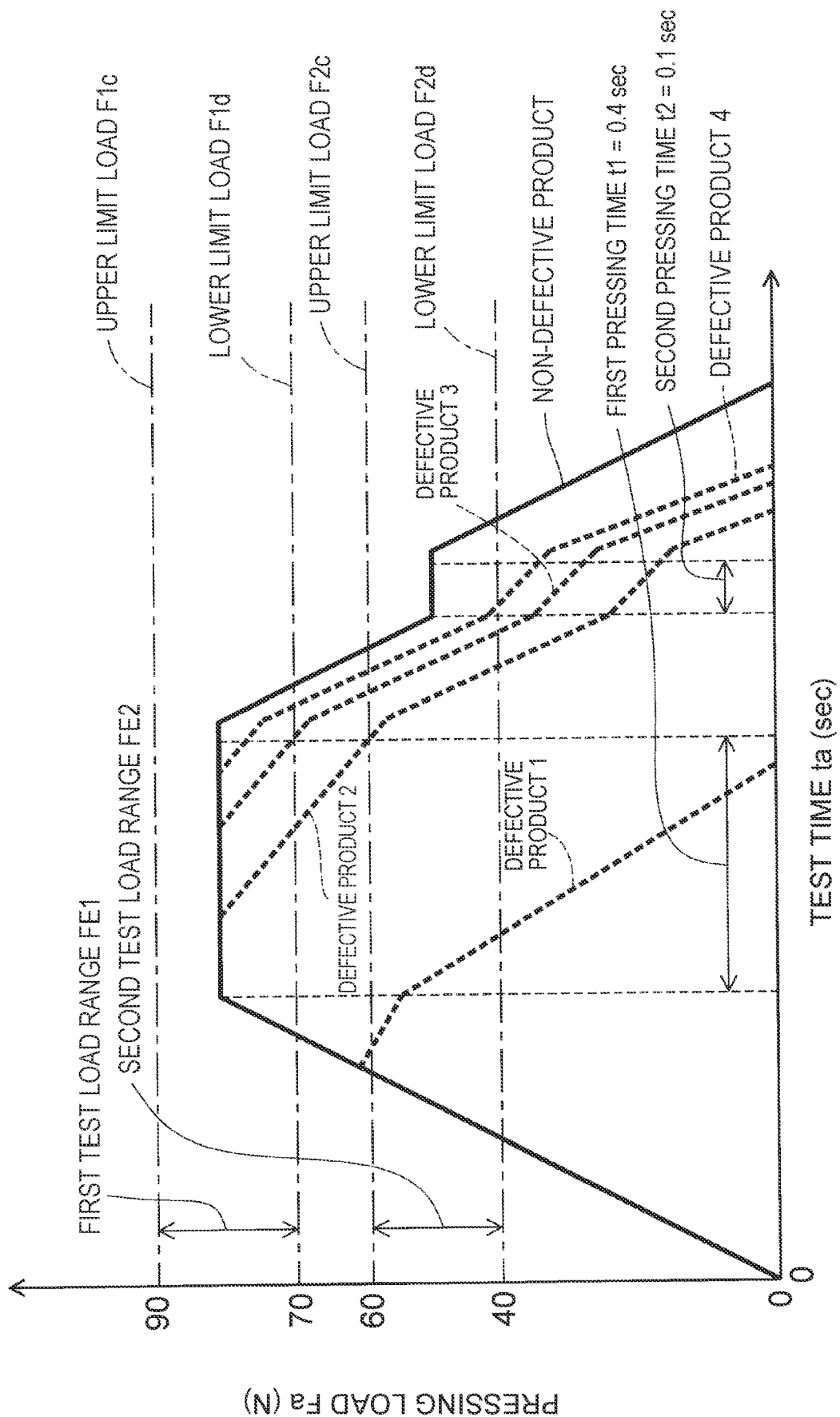
FIG. 11 is a graph showing a relation between a test time to and a pressing load Fa in a test of whether the states of fixing of batteries to the retention holes are good or bad.

Here, FIG. 11 shows an overview of a relation between a test time ta (sec) counted from when the pressing rod 110 comes into contact with the battery 10 (ta=0), and the pressing load Fa (N) detected by the load detection part 165. Other than a waveform (solid line) of a battery 10 of which the state of fixing to the retention hole 20h is determined to be good (non-defective product), four typical waveforms (broken lines) of batteries 10 of which the states of fixing to the retention holes 20h are determined to be bad (defective products) are shown in FIG. 11.

As the pressing unit 105 (pressing rod 110) moves toward the upper side DS, the pressing load Fa with which the pressing rod 110 presses the battery 10 toward the upper side DS increases gradually as shown in FIG. 11. When the pressing unit 105 reaches a predetermined position, the computer 170 controls the moving mechanism 150 so as to stop moving the pressing unit 105 toward the upper side DS and maintain the pressing unit 105 at this position for the first pressing time t1=0.4 sec. The batteries 10 fixed to the battery retaining member 20 can vary in height (vary in position in the height direction DH). However, the fixed-state testing device 100 has the springs 120 each interposed between the pressing rod 110 and the load cell 130, and can absorb such variation in height among the batteries 10 by elastic deformation of these springs 120.

In the first test step S21, the pressing load Fa=about 80 N is applied for the first pressing time t1=0.4 sec to each battery 10 that can maintain the state of being fixed to the retention hole 20h (non-defective product). In other words, a non-defective battery 10 can maintain the pressing load Fa within the first test load range FE1 (70 N to 90 N) for the first pressing time t1=0.4 sec.

Batteries 10 represented by Defective Product 3 and Defective Product 4 in FIG. 11 fail to maintain the fixed state before the end of the first pressing time t1=0.4 sec, so that the pressing load Fa decreases from about 80 N. However, the pressing load Fa still exceeds the lower limit load F1d=70 N of the first test load range FE1 at the end of the first pressing time t1=0.4 sec. Thus, the batteries 10 represented by Defective Product 3 and Defective Product 4 can also maintain the pressing load Fa within the first test load range FE1 (70 N to 90 N) for the first pressing time t1=0.4 sec.

On the other hand, a battery 10 that is extremely insecurely fixed to the retention hole 20h (Defective Product 1 in FIG. 11) shifts (moves relative to the retention hole 20h) immediately after a load starts to be placed thereon, making it impossible to apply the pressing load Fa exceeding the lower limit load F1$d$=70 N of the first test load range FE1 to this battery 10 in the first place. Thus, this battery 10 cannot maintain the pressing load Fa within the first test load range FE1 (70 N to 90 N) for the first pressing time t1=0.4 sec.

As for a battery 10 that is fixed to the retention hole 20$h$ more securely than the battery 10 represented by Defective Product 1 but not securely enough (Defective Product 2 in FIG. 11), the pressing load Fa within the first test load range FE1 (70 N to 90 N) can be applied to the battery 10 at first, but the battery 10 fails to maintain the fixed state before the end of the first pressing time t1=0.4 sec, so that the pressing load Fa decreases below the lower limit load F1$d$=70 N of the first test load range FE1 before the end of the first pressing time t1. Thus, this battery 10 cannot maintain the pressing load Fa within the first test load range FE1 (70 N to 90 N) for the first pressing time t1=0.4 sec, either.

Figure 10:
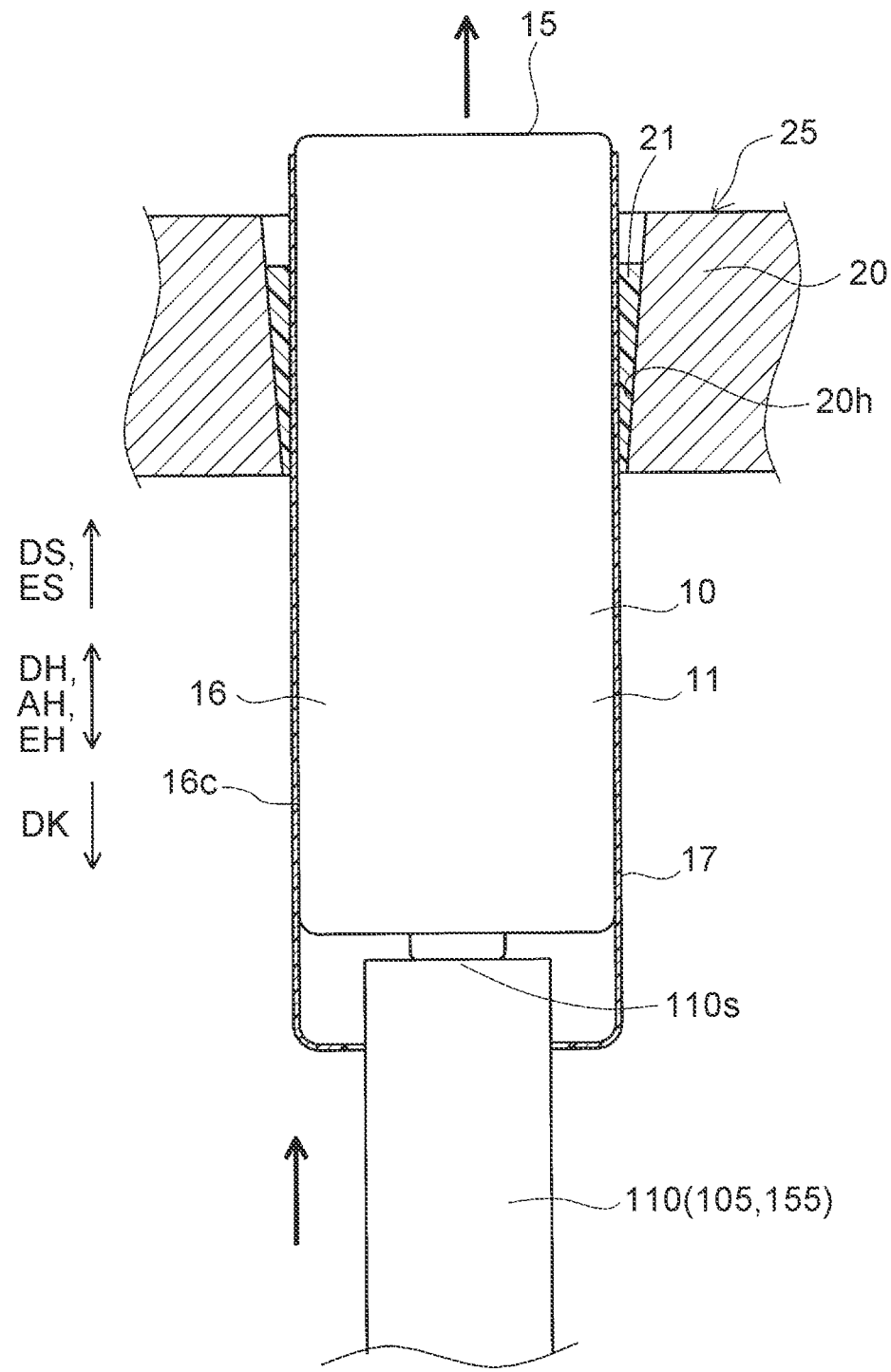
FIG. 10 is an illustration according to the embodiment, showing how a battery main body has moved relative to a heat-shrinkable film and the retention hole by being pressed by the pressing rod.

When the first fixed-state testing step S2 is performed on the batteries 10 represented by Defective Products 1 to 4, the battery main body 16 moves toward the upper side DS relative to the heat-shrinkable film 17 and the retention hole 20$h$ and protrudes toward the upper side DS as shown in FIG. 10.

Next, in a "second test step S22" (see FIG. 6), it is tested whether or not the batteries 10 can maintain the pressing load Fa within the second test load range FE2 (in this embodiment, from the lower limit load F2$d$=40 N to the upper limit load F2$c$=60 N) of which the upper limit load F2$c$ is smaller than the lower limit load F1$d$=70 N of the first test load range FE1 for the second pressing time t2 (in this embodiment, t2=0.1 sec).

Specifically, the moving mechanism 150 is controlled by a command from the computer 170 so as to move the pressing unit 105 toward the lower side DK. As the non-defective battery 10 in FIG. 11 shows, the pressing load Fa with which the pressing rod 110 presses the battery 10 toward the upper side DS decreases gradually as the pressing unit 105 (pressing rod 110) moves toward the lower side DK. When the pressing unit 105 reaches a predetermined position, the computer 170 controls the moving mechanism 150 so as to stop moving the pressing unit 105 toward the lower side DK and maintain the pressing unit 105 at this position for the second pressing time t2=0.1 sec.

In the second test step S22, the pressing load Fa=about 50 N is applied for the second pressing time t2=0.1 sec to each non-defective battery 10 that has been able to maintain the state of being fixed to the retention hole 20$h$. In other words, a non-defective battery 10 can maintain the pressing load Fa within the second test load range FE2 (40 N to 60 N) for the second pressing time t2=0.1 sec.

On the other hand, in the case of the batteries 10 represented by Defective Products 1 to 3 of the batteries 10 represented by Defective Products 1 to 4 that have not been able to maintain the state of being fixed to the retention hole 20$h$, the pressing load Fa has already decreased below the lower limit load F2$d$=40 N of the second test load range FE2 at the start of the second pressing time t2. Thus, the batteries represented by Defective Products 1 to 3 cannot maintain the pressing load Fa within the second test load range FE2 (40 N to 60 N) for the second pressing time t2=0.1 sec.

In the case of the battery 10 represented by Defective Product 4, the pressing load Fa is still within the second test load range FE2 (still exceeds the lower limit load F2$d$=40 N) at the start of the second pressing time t2, but the pressing load Fa decreases gradually and becomes smaller than the lower limit load F2$d$=40 N of the second test load range FE2 by the end of the second pressing time t2=0.4 sec. Thus, the battery 10 represented by Defective Product 4 cannot maintain the pressing load Fa within the second test load range FE2 (40 N to 60 N) for the second pressing time t2=0.1 sec, either.

Next, in a "determination step S23" (see FIG. 6), the fixed states of the batteries 10 are determined to be good when the batteries 10 have been able to maintain the pressing load Fa in both the first test step S21 and the second test step S22. Specifically, as shown in FIG. 11, the non-defective battery 10 can maintain the pressing load Fa within the first test load range FE1 (70 N to 90 N) for the first pressing time t1=0.4 sec. Moreover, the non-defective battery 10 can maintain the pressing load Fa within the second test load range FE2 (40 N to 60 N) for the second pressing time t2=0.1 sec. Therefore, the state of fixing of this battery 10 to the retention hole 20$h$ is determined to be good.

On the other hand, the batteries 10 represented by Defective Products 1 and 2 cannot maintain the pressing load Fa within the first test load range FE1 (70 N to 90 N) for the first pressing time t1=0.4 sec. Moreover, these batteries 10 cannot maintain the pressing load Fa within the second test load range FE2 (40 N to 60 N) for the second pressing time t2=0.1 sec. Therefore, the states of fixing of these batteries 10 to the retention holes 20$h$ are determined to be bad. The batteries 10 represented by Defective Products 3 and 4 can maintain the pressing load Fa within the first test load range FE1 (70 N to 90 N) for the first pressing time t1=0.4 sec. However, these batteries 10 cannot maintain the pressing load Fa within the second test load range FE2 (40 N to 60 N) for the second pressing time t2=0.1 sec. Therefore, the states of fixing of these batteries 10 to the retention holes 20$h$ are also determined to be bad.

Only when the states of fixing to the retention holes 20$h$ of all the n=12 batteries 10 tested in the first fixed-state testing step S2 are good, the computer 170 temporarily determines the battery module 25 to be a non-defective product and moves to the second fixed-state testing step S3 to be described later. On the other hand, when the state of fixing to the retention hole 20$h$ of even one of the n=12 batteries 10 is bad, the computer 170 determines the battery module 25 to be a defective product. The battery module 25 determined to be a defective product is eliminated after the first fixed-state testing step S2.

After the determination step S23, the computer 170 controls the moving mechanism 150 so as to move the pressing unit 105 toward the lower side DK back to the pre-test position. As the non-defective battery 10 in FIG. 11 shows, the pressing load Fa with which the pressing rod 110 presses the battery 10 toward the upper side DS decreases gradually as the pressing unit 105 (pressing rod 110) moves toward the lower side DK, and the pressing load Fa becomes eventually zero.

Next, in the same manner as the first fixed-state testing step S2, the second fixed-state testing step S3, the third fixed-state testing step S4, the fourth fixed-state testing step S5, and the fifth fixed-state testing step S6 (see FIG. 5) are each performed on n=12 batteries 10 among the other 48 batteries 10 that have not yet been tested. Then, the battery module 25 that has been determined to be a non-defective product in the fifth fixed-state testing step S6 (the battery module 25 for which the states of fixing of all the m=60 batteries 10 to the retention holes 20$h$ have been determined to be good) is forwarded to the next assembly step S7.

First, in a "case mounting step S71" (see FIG. 5) of an "assembly step S7," the module case 30 is mounted to the battery module 25. Specifically, the module case 30 is mounted to the battery retaining member 20 from the lower side DK of the battery module 25 so as to house all the batteries 10 inside the module case 30 (see FIG. 3).

Next, in a "negative electrode bus bar unit connecting step S72" (see FIG. 5) of the assembly step S7, the negative electrode terminals 15 of the batteries 10 and the negative electrode bus bar unit 55 are connected to each other. Specifically, the negative electrode bus bar unit 55 is prepared, and the negative electrode connection portions 43 of the negative electrode bus bars 40 (the first negative electrode bus bar 40a, the second negative electrode bus bar 40b, the third negative electrode bus bar 40c, and the fourth negative electrode bus bar 40d) of the negative electrode bus bar unit 55 are resistance-welded to the negative electrode terminals 15 of the batteries 10.

Thus, the negative electrode terminals 15 of the 15 batteries 10 included in the first battery block 80a become electrically conductive with one another through the first negative electrode bus bar 40a. The negative electrode terminals 15 of the 15 batteries 10 included in the second battery block 80b become electrically conductive with one another through the second negative electrode bus bar 40b. The negative electrode terminals 15 of the 15 batteries 10 included in the third battery block 80c become electrically conductive with one another through the third negative electrode bus bar 40c. The negative electrode terminals 15 of the 15 batteries 10 included in the fourth battery block 80d become electrically conductive with one another through the fourth negative electrode bus bar 40d.

Next, in a "positive electrode bus bar unit connecting step S73" (see FIG. 5) of the assembly step S7, the positive electrode terminals 13 of the batteries 10 and the positive electrode bus bar unit 75 are connected to each other. Specifically, the positive electrode bus bar unit 75 is prepared, and the positive electrode connection portions 63 of the positive electrode bus bars 60 (the first positive electrode bus bar 60a, the second positive electrode bus bar 60b, the third positive electrode bus bar 60c, and the fourth positive electrode bus bar 60d) of the positive electrode bus bar unit 75 are resistance-welded to the positive electrode terminals 13 of the batteries 10.

Thus, the positive electrode terminals 13 of the 15 batteries 10 included in the first battery block 80a become electrically conductive with one another through the first positive electrode bus bar 60a. The positive electrode terminals 13 of the 15 batteries 10 included in the second battery block 80b become electrically conductive with one another through the second positive electrode bus bar 60b. The positive electrode terminals 13 of the 15 batteries 10 included in the third battery block 80c become electrically conductive with one another through the third positive electrode bus bar 60c. The positive electrode terminals 13 of the 15 batteries 10 included in the fourth battery block 80d become electrically conductive with one another through the fourth positive electrode bus bar 60d.

Moreover, the lead part 60ar of the first positive electrode bus bar 60a is connected (welded) to the second negative electrode bus bar 40b to thereby connect the first battery block 80a and the second battery block 80b in series to each other. The lead part 60br of the second positive electrode bus bar 60b is connected (welded) to the third negative electrode bus bar 40c to thereby connect the second battery block 80b and the third battery block 80c in series to each other. The lead part 60cr of the third positive electrode bus bar 60c is connected (welded) to the fourth negative electrode bus bar 40d to thereby connect the third battery block 80c and the fourth battery block 80d in series to each other. As a result, the four battery blocks 80a, 80b, 80c, 80d are connected in series to one another. Thus, the battery pack 1 has been completed.

In the fixed-state testing device 100 and the fixed-state testing method using this device, the fixed states of the batteries 10 are determined to be good when, in the fixed-state testing steps S2 to S6, the batteries 10 pressed by the pressing part 155 can maintain the pressing load Fa detected by the load detection part 165 within the first test load range FE1 for the first pressing time t1 and, moreover, can thereafter maintain the pressing load Fa within the second test load range FE2 of which the upper limit load F2c is smaller than the lower limit load F1d of the first test load range FE1 for the second pressing time t2.

Batteries 10 that have been able to maintain the pressing load Fa within the first test load range FE1 for the first pressing time t1 include batteries 10 of which the fixed states have become bad like Defective Products 3 and 4 shown in FIG. 11. However, such batteries 10 of which the fixed states have become bad are unlikely to thereafter maintain the pressing load Fa within the second test load range FE2 for the second pressing time t2. Thus, whether the fixed state of a battery 10 is good or bad can be tested more appropriately than when the fixed state of a battery 10 is determined based only on whether the battery 10 can maintain the pressing load Fa within the first test load range FE1 for the first pressing time t1.

The upper limit load F2c of the second test load range FE2 is set to be smaller than the lower limit load F1d of the first test load range FE1. Because the fixed state of a non-defective battery 10 that has been able to maintain the fixed state while maintaining the pressing load Fa within the first test load range FE1 for the first pressing time t1 is unlikely to become bad when this battery 10 thereafter maintains the pressing load Fa within such a second test load range FE2, this setting can reduce the possibility that the fixed state of a battery 10 may become bad as a result of the battery's maintaining the pressing load Fa within the second test load range FE2. Thus, the fixed-state testing device 100 and the fixed-state testing method using this device can appropriately test the fixed state of a battery 10 fixed to the retention hole 20h of the battery retaining member 20.

Moreover, in this embodiment, the second pressing time t2 is set to be shorter than the first pressing time t1 (t2<t1). The test of whether or not the battery 10 can maintain the pressing load Fa within the second test load range FE2 for the second pressing time t2 is performed to detect a battery 10 that has failed to maintain the fixed state while maintaining the pressing load Fa within the first test load range FE1 for the first pressing time t1. Therefore, the second pressing time t2 need not be long. On the other hand, setting a short second pressing time t2 can reduce the test time.

In this embodiment, a plurality of (n=12) batteries are tested at the same time as to whether the fixed state is good or bad. Accordingly, the total test time (the time required to test all the batteries 10 included in the battery module 25) can be reduced compared with when one battery 10 is tested at a time as to whether the fixed state is good or bad.

In this embodiment, the battery 10 is a film-sheathed battery and the heat-shrinkable film 17 of the film-sheathed battery 10 is fixed to the retention hole 20h of the battery retaining member 20. In such a battery module 25, the battery main body 16 is merely covered with the heat-shrinkable film 17 and therefore moves easily relative to the heat-shrinkable film 17. Even when the heat-shrinkable film 17 is firmly fixed to the retention hole 20h so as not to move relative to the retention hole 20h, the battery main body 16 moves easily relative to the heat-shrinkable film 17 and the retention hole 20h. It is therefore especially preferable to appropriately test the fixed states of the batteries 10 (specifically, the battery main bodies 16) through the first test step S21, the second test step S22, and the determination step S23 and thereby eliminate a battery module 25 in which the fixed state of any battery 10 has turned out to be bad.

In the above-described manufacturing method of the battery pack 1, the batteries 10 are inserted into the retention holes 20h of the battery retaining member 20 and fixed in the insertion and fixation step S1, and then whether the states of fixing of the batteries 10 to the retention holes 20h are good or bad is tested by the above-described fixed-state testing method in each of the fixed-state testing steps S2 to S6. Thus, whether the fixed states of the batteries 10 are good or bad can be appropriately tested. Then, in the assembly step S7, the battery pack 1 is assembled by using a battery module 25 for which the fixed states of all the batteries 10 have been determined to be good in the fixed-state testing steps S2 to S6, so that a highly reliable battery pack 1 can be manufactured.

While the present disclosure has been described above based on the embodiment, it should be understood that the present disclosure is not limited to this embodiment but can be applied with changes made thereto as appropriate within the scope of the gist of the disclosure. For example, in each of the fixed-state testing steps S2 to S6 according to the embodiment, the pressing unit 105 (pressing rods 110) is moved toward the lower side DK back to the pre-test position after the determination step S23 is performed. However, the present disclosure is not limited to this example. For example, the pressing unit 105 (pressing rods 110) may be moved toward the lower side DK back to the pre-test position after the second test step S22 is performed and before the determination step S23 is performed.

What is claimed is:

1. A fixed-state testing method for testing a battery module including a battery and a battery retaining member having a retention hole in which the battery is inserted and fixed as to whether a state of fixing of the battery to the retention hole is good or bad, the fixed-state testing method comprising:
   a first test step of pressing the battery toward one side in an axial direction along a hole axis of the retention hole and testing whether or not the battery is able to maintain a pressing load with which the battery is pressed within a first test load range for a first pressing time;
   a second test step of, after the first test step, testing whether or not the battery is able to maintain the pressing load within a second test load range of which an upper limit load is smaller than a lower limit load of the first test load range for a second pressing time; and
   a determination step of determining the fixed state of the battery to be good when the battery has been able to maintain the pressing load in both the first test step and the second test step.

2. The fixed-state testing method according to claim 1, wherein the second pressing time is set to be shorter than the first pressing time.

3. The fixed-state testing method according to claim 1, wherein:
   the battery module includes m batteries, with m being a natural number not smaller than two; and
   the first test step, the second test step, and the determination step are performed on n batteries at the same time, with n being a natural number not smaller than two nor larger than m.

4. The fixed-state testing method according to claim 1, wherein:
   the battery retained in the retention hole is a film-sheathed battery having a battery main body covered with a heat-shrinkable film around a periphery in a radial direction orthogonal to an axial direction along a battery axis; and
   the heat-shrinkable film of the film-sheathed battery is fixed to the retention hole.

5. A manufacturing method of a battery pack that includes a battery module including a battery and a battery retaining member having a retention hole in which the battery is inserted and fixed, the manufacturing method comprising:
   an insertion and fixation step of inserting the battery into the retention hole of the battery retaining member and fixing the battery;
   a fixed-state testing step of testing whether a state of fixing of the battery to the retention hole is good or bad by the fixed-state testing method according to claim 4; and
   an assembly step of assembling the battery pack by using the battery module for which the fixed state of the battery has been determined to be good in the fixed-state testing step.

* * * * *